United States Patent [19]

Kerkar et al.

[11] Patent Number: 5,604,273

[45] Date of Patent: Feb. 18, 1997

[54] DRYING SHRINKAGE CEMENT ADMIXTURE

[75] Inventors: Awdhoot V. Kerkar; Brian S. Gilbert, both of Columbia, Md.

[73] Assignee: W. R. Grace & Co.-Conn., New York, N.Y.

[21] Appl. No.: 529,390

[22] Filed: Sep. 18, 1995

[51] Int. Cl.$^6$ .............................. C04B 24/02; C08K 5/05; C08F 122/04

[52] U.S. Cl. ..................... 524/4; 524/5; 524/8; 524/388; 106/802; 106/709

[58] Field of Search ........................ 524/4, 5, 8, 388; 106/802

[56] References Cited

U.S. PATENT DOCUMENTS

| | | | |
|---|---|---|---|
| 3,486,916 | 3/1969 | Cordon | 106/802 |
| 3,583,880 | 7/1971 | Moren | 427/314 |
| 3,709,707 | 11/1973 | Rehmar | 106/642 |
| 4,141,737 | 12/1979 | Moon | 106/12 |
| 4,302,251 | 1/1981 | Udagawa | 106/708 |
| 4,547,223 | 10/1985 | Goto | 106/802 |
| 4,946,904 | 8/1990 | Akimoto | 525/327.8 |
| 4,975,121 | 12/1990 | Sakuta | 106/724 |
| 5,016,711 | 5/1991 | Cowan | 166/293 |
| 5,020,598 | 6/1991 | Cowan | 166/293 |
| 5,142,036 | 8/1992 | Akimoto et al. | 106/823 |
| 5,174,820 | 12/1992 | Sakuta | 106/724 |
| 5,181,961 | 1/1993 | Umaki | 106/724 |
| 5,362,323 | 11/1994 | Koyata et al. | 524/5 |
| 5,413,634 | 5/1995 | Shawl | 106/696 |
| 5,432,212 | 7/1995 | Honda et al. | 524/4 |

FOREIGN PATENT DOCUMENTS

| | | |
|---|---|---|
| 88115639.2 | 3/1989 | European Pat. Off. . |
| 643022 | 3/1995 | European Pat. Off. . |
| 4676310 | 6/1973 | Japan . |
| 54-110903 | 8/1979 | Japan . |
| 55-027819 | 2/1980 | Japan . |
| 57-145054 | 9/1982 | Japan . |
| 56-500786 | 11/1982 | Japan . |
| 58-60293 | 4/1983 | Japan . |
| 57129880 | 2/1984 | Japan . |
| 59-128240 | 7/1984 | Japan . |
| 59-128242 | 7/1984 | Japan . |
| 59-128251 | 7/1984 | Japan . |
| 59-131552 | 7/1984 | Japan . |
| 59-137383 | 8/1984 | Japan . |
| 1145357 | 6/1989 | Japan . |
| 251461 | 2/1990 | Japan . |

*Primary Examiner*—Tae Yoon
*Attorney, Agent, or Firm*—Howard J. Troffkin

[57] ABSTRACT

The subject invention is directed to a cement admixture composition composed of certain alkylene glycols and copolymers of alkenyl ether and maleic anhydride. The present admixture provides a means to inhibit drying shrinkage of cement compositions while enhancing the compressive strength of the set composition.

16 Claims, No Drawings

DRYING SHRINKAGE CEMENT ADMIXTURE

BACKGROUND OF THE INVENTION

The present invention is directed to a cement admixture composition capable of causing the combined effects of inhibiting drying shrinkage of cement compositions while enhancing the compressire strength of the fully set composition. The present invention further provides an improved concrete composition structural product.

Specifically, the present invention is directed to a cement admixture composed of a synergistic combination of certain alkylene glycols and alkenyl ether/maleic anhydride copolymers, as fully described hereinbelow.

Hydraulic cement compositions, such as mortar (cement, small particulate, e.g. sand, and water), or concrete (cement, small particulate, large particulate, e.g. gravel, and water), have certain properties which substantially affect their durability. These properties include shrinkage which normally occurs during drying of the cement composition. In addition, mortars and, in particular, concrete composition are used for structural applications where enhanced strength of the cured structural member is highly desired.

Conventional hydraulic cement compositions display a decrease in volume with setting and drying of the cast composition. Although the magnitude of the volume decrease is normally small, it is of extreme importance. This shrinkage results in cracks and other defects which lower the serviceability and durability of the resultant structure. The cracks provide a path for air to penetrate into the structure, promoting carbonation of the cement and corrosion of the metal reinforcing bars contained therein. Further, the cracks provide a means for water to seep into and through the structure. Such water entry further deteriorates the structure through freeze-thaw cycling pressures exerted on the cement structure over its life. It is highly desired to provide a cement which exhibits high strength and is not subject to deterioration effects due to shrinkage and freeze-thaw cycling.

Various attempts have been made to avoid the cracking phenomenon caused by drying shrinkage. These include providing joints in the cement structure to concentrate the site of crack formation at the joint and, thereby, minimize such formation at other portions of the structure. Such joints are expensive to install; are not applicable to certain structures such as vertical walls, pillars and the like; and merely concentrate the area of cracking but do not alleviate it.

Other attempts include varying the composition of the cement, varying the methods of manufacture of concrete mix and varying the ballast material used in forming the resultant concrete structure. None of these attempts have resulted in a satisfactory solution. For example, cements have been formulated with expansive admixtures in attempts to counter the shrinkage of the concrete. However, it is difficult to determine the proper amount of expansive admixture required to counter the drying shrinkage which develops. The use of such materials thereby give rise to unpredictable results.

With respect to overcoming the drying shrinkage of cement compositions, such as concrete compositions, the literature teaches that various oxyalkylene adducts are suitable for this purpose. For example, U.S. Pat. Nos. 3,663,251 and 4,547,223 suggest the use of compounds of the general formula $RO(AO)_nH$ in which R may be a $C_{1-7}$ alkyl or $C_{5-6}$ cycloaklyl radical, A may be $C_{2-3}$ alkylene radicals and n is 1–10, as shrinkage reducing additives for cement. Similarly, U.S. Pat. No. 5,147,820 suggests terminally alkyletherified or alkylesterified oxyalkylene polymers as useful for shrinkage reduction. Still further, Japanese Patent Application 58-60293 provides the suggestion that shrinkage reduction of cement can be accomplished by the addition thereto of compounds which are aliphatic, allcyclic or aromatic group terminated oxyethylene and/or oxypropylene repeating chain compounds.

One of the main advantages of using cement compositions, such as mortar and concrete, to form architectural structural members is their ability to be cast into a desired form which is capable of exhibiting high compressire strength. With this in mind, the artisan does not desire to utilize admixtures or other ingredients which cause a decrease in such strength.

It is highly desired to provide a cement admixture which is capable of inhibiting drying shrinkage of structural cement compositions while enhancing the compressire strength of the resultant cured structure.

Alkylene glycols and glycerols have been used in combination with cement compositions for particular purposes. For example, these materials have been added to inhibit water crystal formation when casting in cold climate conditions or to inhibit the rate of evaporation of water in cement slurries used in high temperature well bore hole applications. Further, these additives have been used to provide a layer above case, unset cement composition to inhibit evaporation of water at the surface portion of the structure and thereby enhancing the hydration of the cement at that portion of the formation.

The above compounds when made part of an unset composition additives cause the resultant cured composition to exhibit lower compressire strength than its untreated counterpart. When the cement composition is a mortar or, in particular, a concrete which is used to provide architectural structural members for buildings, parking garages, bridge decks and the like, it is essential that the mortar or concrete member exhibit higher compressire strength than its untreated counterpart. Therefore, shrinkage reducing additives which decrease the strength of the cured product have not found favor even though they inhibit cracking in the member as discussed above.

SUMMARY OF THE INVENTION

The present invention is directed to a cement admixture, and a method of forming an improved structural cement formation, which is capable of inhibiting drying shrinkage and causing enhanced compressire strength to the treated formation. The admixture comprises a synergistic mixture of a lower alkylene diol having secondary and/or tertiary hydroxy groups with an alkenyl ether/maleic anhydride copolymer. alkenyl ether/maleic anhydride copolymers are used, one attains the desired combination of inhibition of drying shrinkage and enhanced compressire strength to the resultant cement structure. It has now been found that when one uses the copolymers described herein with an alkylene diol, one overcomes the depression of compressire strength normally observed with such diols.

The present unique combination of compounds forming the subject cement admixture requires the use of an alkylene Glycol represented by the General formula HOBOH (Formula I) wherein B represents a $C_5$–$C_{12}$ alkylene group, preferably a $C_5$–$C_8$ alkylene group and at least one hydroxyl group is selected from a secondary or a tertiary hydroxy group. The preferred diols are secondary and/or tertiary dihydroxy $C_5-C_8$ alkanes which are represented by the formula:

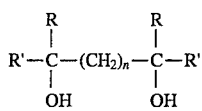
                                                                II wherein each R independently represents a hydrogen atom or a $C_1-C_2$ alkyl Group, each R' represents a $C_1-C_2$ alkyl group and n represents an integer of 1 or 2. The most preferred compound is 2-methyl-2,4-pentanediol.

The present cement admixture further requires the use of at least one alkenyl ether/maleic anhydride copolymer, which is represented by the formula:

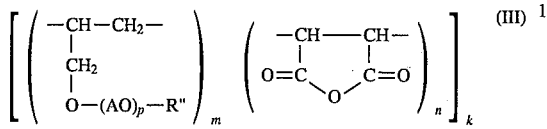
                                                                (III)

wherein

R" represents $C_1-C_{40}$ hydrocarbon group;

AO represents a $C_2-C_{18}$ oxyalkylene group or mixtures thereof;

p represents an average molar number of the said oxyalkylene group and is an integer of at least 25, preferably from 25 to 100 and most preferably from 25–75;

m and n are each independently an integer of from 1 to 3, preferably each is approximately 1;

k is an integer of from 1 to 100; and wherein the monomeric units forming said copolymer may be linked in blocks or at random.

The component (n) can be present in the form of the anhydride, or a partially or completely hydrolyzed product or as a salt of the hydrolyzed product.

Exemplary $C_{2-18}$ oxyalkylene groups represented by AO in the above described formula (III) include oxyethylene, oxypropylene, oxybutylene, oxytetramethylene, oxydodecylene, oxytetradecylene, oxyhexadecylene and, oxyoctadecylene and the like. The preferred oxyalkylene groups are $C_{2-4}$ oxyalkylenes such as oxyethylene, oxypropylene or oxybutylene. The AO may include two or more types of oxyalkylene moieties and such oxyalkylene moieties may be linked in blocks or at random.

Examples of the $C_1-C_{40}$ hydrocarbon group represented by R" in the above described formula (III) include methyl, ethyl, propyl, isopropyl, butyl, isobutyl, tertiary butyl, amyl, isoamyl, hexyl, heptyl, 2-ethylhexyl, octyl, nonyl, decyl, undecyl, dodectyl, isotridodecyl, tetradecyl, hexadecyl, isohexadecyl, isotridodecyl, tetradecyl, oleyl, octyldodecyl, decyltetradecyl, benzyl, cresyl, butylphenyl, dibutylphenyl, octylphenyl, nonylphenyl, dodecylphenyl, dioctylphenyl, dinonylphenyl, naphthyl and styrenated phenyl groups and the like.

The number average molecular weight of the copolymer which can be employed in the present invention is not particularly limited. The number average molecular weight is preferably 1,000 to 200,000.

The hydrolyzed product is a product having a hydrolyzed maleic acid unit resulting from the hydrolysis of the maleic anhydride unit in the copolymer.

The salt of the hydrolyzed product of the copolymer is a salt formed by the maleic acid unit. Exemplary salts include alkali metal salts and alkaline earth metal salts such as lithium salts, sodium salts, potassium salts, magnesium salts and calcium salts; ammonium salts; and organic amine salts such as methylamine salts, ethylamine salts, ethylenediamine salts, tetramethylenediamine salts, monoethanolamine salts, diethanolamine salts. The preferred salts are those of sodium, potassium or calcium.

The copolymer represented by formula (III) can be prepared by the method described in Japanese Patent Publication (Kokai) No. 297411/89. More specifically, the copolymer can be prepared by the bulk or suspension polymerization of an alkenyl ether represented by the formula

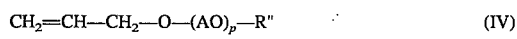
$$CH_2=CH-CH_2-O-(AO)_p-R''$$ (IV)

wherein A, R" and p are the same as defined in formula (I) and maleic anhydride. The polymerization is conducted in the presence of a polymerization initiator such as an organic peroxide or an azo compound.

The subject copolymer III may further be formed with other ethylenically unsaturated monomers which are copolymerizable with the alkenyl ether and the maleic anhydride such as styrene, an alpha-olefin or vinyl acetate. Such monomers should be present in minor amounts such as up to about 30 percent by weight preferably 10 percent by weight based on the total weight of the monomeric units.

It is preferred that the alkenyl ether/maleic anhydride copolymer component IV be formed from alkenyl ether comonomer represented by

$$CH_2=CH-CH_2-O(AO)_pR''$$ IV wherein R" represents a $C_1-C_4$ alkyl, AO represents a $C_2-C_4$ oxyalkylene group and x represents an average molar number selected from at least about 25, preferably from about 25 to 100 and most preferably from about 25 to 75.

Each of the copolymers may be in the form of an anhydride or its hydrolyzed product resulting from the partial or substantially complete hydrolysis of the maleic anhydride units in the copolymer or a salt of the resultant maleic acid units. The salt can be of an alkali or alkaline earth metal or ammonium or a protonated organic amine.

The subject cement admixture composition should contain component of Formula I to component of Formula III in a weight ratio of from about 1 to 100 and preferably from 3 to 20. The admixture may be neat or be composed of an aqueous solution of the required combination. It has been unexpectedly found that the resultant maleic acid units. The salt can be of an alkali or alkaline earth metal or ammonium or a protonated organic amine.

The subject cement admixture composition should contain component of Formula I to component of Formula III in a weight ratio of from about 1 to 100 and preferably from 3 to 20. The admixture may be neat or be composed of an aqueous solution of the required combination. It has been unexpectedly found that the required components I and III are substantially miscible in one another and can provide a storage stable composition with very small amounts (e.g. 10 weight percent) water. Thus, the present composition does not require the addition, transportation and storage of large amounts of water. Aqueous solutions preferably contain the combination of components in from 10 to 50 weight percent although greater or lesser concentrations may be suitable in certain instances.

The admixture composition of the present invention may be used with hydraulic cements suitable for architectural structural application, such as ordinary, quick-hardening and moderate-heat portland cements, high alumina cements, blast-furnace slag cement and the like. Of these, portland cements of the ordinary and quick-hardening types are particularly desired and most readily used to form architectural structural members.

The cement admixture of the present invention should be present in from about 0.1 to about 3, preferably about 0.5 to about 3 and most preferably from about 1 to about 2 weight percent based on the weight of cement content of the cement composition being treated. The quantity of least one component of Formula III which are described above. The improved cement may be formed at any stage of the cement's formation or use, such as by applying the admixture to cement powder during the blending with other dry materials to prepare a specific type of cement. Although small amounts of water may be present during the blending, the amount of water will be insufficient to cause substantial hydration of the cement.

Alternately, an improved cement composition can be formed in situ during the course of preparing a cement composition such as a mortar mix or a concrete. The admixture composition can be added either separately or as part of the water of hydration. When the admixture is in the form of an aqueous solution, the water content of the solution should be calculated as part of the total water content of the cement composition.

Various conventional ingredients may be optionally used. Among the optionally employable ingredients are: conventional hardening accelerators, e.g. metal chlorides such as calcium chloride and sodium chloride, metal sulfates, such as sodium sulfate, and organic amines such as triethanolamine; ordinary hardening retarders, e.g. alcohols, sugars, starch and cellulose; reinforcing-steel corrosion inhibitors such as a sodium nitrate and calcium nitrite; water reducing agents and high-range water reducers such as lignosulfonic acids and their salts, and derivatives, hydroxylated carboxylic acids and their salts, condensation products of naphthalenesulfonic acids and formalic, sulfonated melamine polycondensation products, amines and their derivatives, alkanolamines, and inorganic salts such as borates, phosphates, chlorides and nitrates; super plasticizers; and the like. The quantity of such an optional ingredient or ingredients is usually 0.05-6% by weight of the cement.

The addition of the cement admixture composition of the present invention to a cement will markedly reduce the drying shrinkage of the resulting cement composition (e.g. mortar and concrete) and will exhibit enhanced compressive strength compared with that of untreated composition or relative to cement composition having only one of the components of the present admixture.

The following examples are given for illustrative purposes only and are not meant to be a limitation on the invention, as defined by the claims appended hereto. All parts and percentages are by weight unless otherwise indicated.

Example I

A series of micro concrete samples were made according to the following procedure: 1800 parts of Type I Portland cement from three different suppliers (Labeled "A", "B" and "C") were each blended with a mixture of the following ASTM graded sands: 1069 parts of F-95 sand, 972 parts of C-109, 972 parts of C-185, and 1847 parts of 15S sand. The dry blending was done in a Hobart mixer for approximately 0.5 minutes. The aggregate to cement ratio was 2.7. To each of the blends was added 900 parts of deionized water (w/c=0.5 for blank). The blends were thoroughly mixed in the Hobart mixer for approximately nine (9) additional minutes to form the micro-concrete reference materials.

The air content of the resulting micro concretes were measured using ASTM C-185 test method. The slump of each of the concretes was measured using the ASTM C-143 test method. The micro concretes were then poured into 2"×2"×2" cube molds. Each mold was evenly filled by tamping in the mix and by screeding off (leveling off) any excess mix from the surface. The molds were maintained in a fog room at room temperature and 100% relative humidity to allow the samples to cure. Sets of three cubes were removed from the fog chamber after 1, 7 and 28 days of curing. The cubes were demolded and tested for compressive strength using a Soil Test Machine. Compressive strengths of the three cubes were measured and average values are reported in the attached Table 1.

Example II

Following the above procedure, additional cubes containing various amounts of 2-methyl-2,4-pentanediol ("MPD") and MPD in combination with a copolymer of Formula III in which p=about 35, AO=oxyethylene, R" is methyl and m and n are about 1:1 ("Copolymer M-1511") were made. All the mixes were made at constant slump by adjusting the amount of water in accordance with the amount and type of admixture used. A summary of all the admixtures tested is given in Table 1. As seen in Table 1, addition of MPD seems to reduce the early age strength of mortar by 15–20% compared to the blank. Copolymer M-1511, on the other hand, results in an early strength enhancement of approximately 50–60% compared to the blank. MPD in combination with copolymer M-1511, however, gives an overall strength enhancement of approximately 70%. These results have been found to be consistent in three different types of cement as shown in Table 1.

Example III

The experimental procedure of Example II was repeated using a Portland Cement of a different supplier (Cement "D") and different cement superplasticizers were used and compared with the required copolymer III of the present invention. Data in Table 2 indicates that the above synergy found with the present combination is not exhibited by MPD when used in combination with other conventional superplasticizers, such as naphthalene-sulfonate formaldehyde condensate (NSF), polyacrylic acid (PAA), polyacrylic acid-methyl terminated polyoxyethylene amine adduct (PAJ) and M-0531, (a low AO (p=about 10) copolymer), a lower molecular weight counterpart of copolymer M-1511.

Example IV

Micro-concrete mixes made in the same manner as in the Examples I and II above were cast in stainless steel prism molds (1"×1"×12") following ASTM C-490 test procedure. The mixes were cured for 24 hours at 100% RH and 20° C. The prisms were demolded and stored in environmental chamber maintained at 50% RH and 20° C. The length of the prisms was measured periodically using a length comparator following the ASTM test procedure. Table 3 summarizes the data of % shrinkage reduction observed in presence of MPD and MPD in combination with copolymer M-1511 in comparison to the blank. The data indicate that combination of MPD with copolymer M-1511 does not compromise the shrinkage reduction inhibition performance of MPD.

TABLE 1

| Cement | DIOL | Dosage (%) | Copolymer | Dosage (%) | W/C Ratio | Slump (cm) | Air (%) | Set-Time (min) | Strength (% 1 Day) | Strength (% 7 Day) | Strength (% 28 Day) |
|---|---|---|---|---|---|---|---|---|---|---|---|
| A | None | — | None | — | 0.50 | 10.6 | 10.1 | 247 | 100 | 100 | 100 |
|   | MPD | 1.0 | None | — | 0.48 | 10.6 | 11.9 | 267 | 92 | 104 | 108 |
|   | MPD | 2.0 | None | — | 0.46 | 10.2 | 10.4 | 280 | 84 | 102 | 102 |
|   | MPD | 1.0 | M-1511 | 0.10 | 0.42 | 11.1 | 9.8 | 350 | 125 | 145 | 158 |
| B | None | — | None | — | 0.50 | 8.4 | 7.6 | 373 | 100 | 100 | 100 |
|   | MPD | 1.0 | None | — | 0.48 | 8.4 | 8.8 | 438 | 83 | 81 | 80 |
|   | MPD | 2.0 | None | — | 0.46 | 8.3 | 7.9 | 492 | 63 | 82 | 70 |
|   | None | — | M-1511 | 0.10 | 0.43 | 9.8 | 8.5 | 403 | 159 | 137 | 108 |
|   | MPD | 1.0 | M-1511 | 0.10 | 0.41 | 8.2 | 7.8 | 367 | 157 | 174 | 183 |
|   | MPD | 2.0 | M-1511 | 0.10 | 0.41 | 10.3 | 7.3 | 554 | 90 | 131 | 111 |
| C | None | — | None | — | 0.50 | 9.6 | 9.2 | 227 | 100 | 100 | 100 |
|   | MPD | 1.0 | None | — | 0.48 | 9.2 | 11.9 | 277 | 70 | 85 | 104 |
|   | MPD | 2.0 | None | — | 0.46 | 9.0 | 11.3 | 255 | 71 | 86 | 90 |
|   | None | — | M-1511 | 0.10 | 0.42 | 10.1 | 13.0 | 298 | 151 | 134 | 109 |
|   | MPD | 1.0 | M-1511 | 0.10 | 0.42 | 11.1 | 9.3 | 313 | 119 | 148 | 140 |
|   | MPD | 2.0 | M-1511 | 0.10 | 0.41 | 11.1 | 7.8 | 367 | 112 | 147 | 115 |

TABLE 2

| DIOL | Dosage (%) | Copolymer | Dosage (%) | W/C Ratio | Slump (cm) | Air Content (%) | Strength Reduction (% 1 Day) | Strength Reduction (% 7 Day) | Strength Reduction (% 28 Day) |
|---|---|---|---|---|---|---|---|---|---|
| None | — | None | — | 0.50 | 10.5 | 8.5 | 100 | 100 | 100 |
| MPD | 1.0 | None | — | 0.48 | 10.9 | 10.3 | 86 | 78 | 90 |
| MPD | 2.0 | None | — | 0.46 | 10.0 | 10.0 | 79 | 75 | 86 |
| MPD | 1.0 | NSF | 0.42 | 0.42 | 10.7 | 11.1 | 119 | 109 | 102 |
| MPD | 1.0 | PAA | 0.32 | 0.42 | 9.8 | 10.7 | 85 | 91 | 89 |
| MPD | 1.0 | PAJ | 0.09 | 0.42 | 10.9 | 10.9 | 100 | 100 | 98 |
| MPD | 1.0 | M-0531 | 0.10 | 0.42 | 10.9 | 15.7 | 64 | 80 | 72 |
| MPD | 1.0 | M-1511 | 0.10 | 0.42 | 10.4 | 15.0 | 145 | 127 | 109 |

TABLE 3

| Cement Type | DIOL | Dosage (%) | Copolymer | Dosage (%) | W/C Ratio | Slump (cm) | Air (%) | Set-Time (min) | Strength (% 1 Day) | Strength (% 7 Day) | Strength (% 28 Day) | Shrinkage Reduction |
|---|---|---|---|---|---|---|---|---|---|---|---|---|
| B | None | — | None | — | 0.50 | 8.4 | 3.2 | 245 | 100 | 100 | 100 | 0% |
|   | None | — | M-1511 | 0.10 | 0.42 | 8.5 | 8.2 | 298 | 150 | 115 | 103 | 3% |
|   | MPD | 1.0 | None | — | 0.48 | 8.1 | 5.3 | 295 | 78 | 98 | 97 | 17% |
|   | MPD | 1.0 | M-1511 | 0.10 | 0.41 | 9.6 | 8.3 | 346 | 130 | 139 | 113 | 27% |
|   | MPD | 2.0 | None | — | 0.47 | 8.6 | 5.8 | 297 | 64 | 89 | 82 | 32% |
|   | MPD | 2.0 | M-1511 | 0.10 | 0.40 | 9.6 | 7.3 | — | 85 | 117 | 101 | 45% |
| C | None | — | None | — | 0.50 | 10.5 | 4.6 | 155 | 100 | 100 | 100 | 0% |
|   | None | — | M-1511 | 0.10 | 0.42 | 11.0 | 14.9 | 216 | 116 | 103 | 91 | 8% |
|   | MPD | 1.0 | None | — | 0.48 | 10.1 | 8.3 | 194 | 78 | 89 | 100 | 30% |
|   | MPD | 1.0 | M-1511 | 0.10 | 0.41 | 10.6 | 9.5 | 232 | 117 | 116 | 126 | 28% |
|   | MPD | 2.0 | None | — | 0.47 | 10.0 | 8.1 | 226 | 73 | 89 | 94 | 45% |
|   | MPD | 2.0 | M-1511 | 0.10 | 0.40 | 10.6 | 10.5 | 258 | 95 | 115 | 110 | 47% |

What is claimed is:

1. A cement admixture capable of controlling drying shrinkage of concrete compositions and enhancing the compressive strength of the resultant treated formation formed with said composition, comprising a mixture of A. at least one $C_3$–$C_{12}$ alkylenediol, wherein each hydroxyl group of said alkylenediol is independently selected from secondary hydroxyl or tertiary hydroxyl groups; and B. at least one copolymer represented by the formula

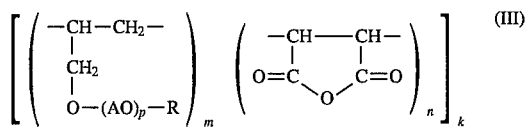

(III)

wherein

R represents $C_1$–$C_{40}$ hydrocarbon group;

AO represents a $C_2$–$C_{18}$ oxyalkylene group or mixtures thereof;

p represents an average molar number of the said oxyalkylene group and is an integer of at least 25;

m and n are each independently an integer of from 1 to 3;

k is an integer of from 1 to 100 or the hydrolyzed product of said copolymer and salts of said hydrolyzed product; wherein said mixture has component A to component B in a weight ratio of from about 1 to 100.

2. The admixture of claim 1 wherein said alkanediol is a $C_5$–$C_8$ alkanediol.

3. The admixture of claim 2 wherein said alkanediol is represented by the formula

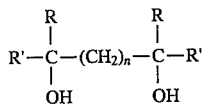

II wherein each R represents a hydrogen atom or $C_1$–$C_2$ alkyl; each R' represents $C_1$–$C_2$ alkyl; and n represents 1 or 2.

4. The admixture of claim 3 wherein said alkanediol is 2-methyl-2,4-pentanediol.

5. The admixture of claim 1 wherein the copolymer B is composed of an alkenyl ether group wherein p is 25 to 75, R is selected from $C_1$–$C_4$ alkyl and AO are $C_2$–$C_4$ oxyalkylene groups or mixtures of said groups.

6. The admixture of claim 2 wherein the copolymer B is composed of an alkenyl ether group wherein p is 25 to 75, R is selected from $C_1$–$C_4$ alkyl and AO are $C_2$–$C_4$ oxyalkylene groups or mixtures of said groups.

7. The admixture of claim 3 wherein the copolymer B is composed of an alkenyl ether group wherein p is 25 to 75, R is selected from $C_1$–$C_4$ alkyl and AO are $C_2$–$C_4$ oxyalkylene groups or mixtures of said groups.

8. The admixture of claim 4 wherein the copolymer B is composed of an alkenyl ether group wherein p is 25 to 75, R is selected from $C_1$–$C_4$ alkyl and AO are $C_2$–$C_4$ oxyalkylene groups or mixtures of said groups.

9. The admixture of claim 5 wherein copolymer B has molar ratio of m to n of about 1:1 and the AO group represents oxyethylene, oxypropylene or mixtures thereof in random or block configuration.

10. The admixture of claim 6 wherein copolymer B has molar ratio of m to n of about 1:1 and the AO group represents oxyethylene, oxypropylene or mixtures thereof in random or block configuration.

11. The admixture of claim 7 wherein copolymer B has molar ratio of m to n of about 1:1 and the AO group represents oxyethylene, oxypropylene or mixtures thereof in random or block configuration.

12. The admixture of claim 8 wherein copolymer B has molar ratio of m to n of about 1:1 and the AO group represents oxyethylene, oxypropylene or mixtures thereof in random or block configuration.

13. A method of inhibiting drying shrinkage of a cement composition while improving compressive strength of a resultant architectural structural formation formed with said composition comprising i) forming a mixture of a hydraulic cement, fine aggregate, coarse aggregate and water having a water to cement ratio of from 0.25:1 to 0.7:1 with from 0.1 to 5 weight percent based on the weight of the hydraulic cement of the admixture of claims 1, 2, 3, 4, 5, 6, 7, 8, 9, 10, 11 or 12.

14. The admixture of claim 1 wherein the symbol p of copolymer B has a value of 25 to 100.

15. The admixture of claim 1 wherein the symbol p of copolymer B has a value of 25 to 75.

16. A concrete composition composed of hydraulic cement, fine aggregate, coarse aggregate, water in an amount to provide a water to cement ratio of 0.25 to 0.7 and from 0.1 to 5 weight percent based on the hydraulic cement of the admixture of claim 1, 2, 3, 4, 5, 6, 7, 8, 9, 10, 11 or 12.

* * * * *